United States Patent [19]

Dimock

[11] Patent Number: 4,747,577
[45] Date of Patent: May 31, 1988

[54] GATE VALVE WITH MAGNETIC CLOSURE FOR USE WITH VACUUM EQUIPMENT

[75] Inventor: Jack A. Dimock, Santa Barbara, Calif.

[73] Assignee: The BOC Group, Inc., Montvale, N.J.

[21] Appl. No.: 889,442

[22] Filed: Jul. 23, 1986

[51] Int. Cl.[4] .............................................. F16K 3/16
[52] U.S. Cl. .................................... 251/158; 251/193; 251/65
[58] Field of Search .................. 251/158, 193, 65, 328

[56] References Cited

U.S. PATENT DOCUMENTS

| | | | |
|---|---|---|---|
| 2,556,225 | 6/1951 | Serge | 251/193 |
| 2,575,906 | 11/1951 | Bullard | 251/65 X |
| 3,641,973 | 2/1972 | Shrader | 118/49 |
| 3,665,958 | 5/1972 | Dunkelis | 251/65 X |
| 4,056,255 | 11/1977 | Lace | 251/129 |
| 4,238,111 | 12/1980 | Norman | 251/193 |
| 4,403,765 | 9/1983 | Fisher | 251/65 |
| 4,410,008 | 10/1983 | Gottling et al. | 137/627 |
| 4,534,539 | 8/1985 | Dettmann | 251/65 |
| 4,534,714 | 8/1985 | Smith | 417/416 |

FOREIGN PATENT DOCUMENTS

212570 8/1909 Fed. Rep. of Germany ........ 251/65
1119722 8/1965 United Kingdom .

Primary Examiner—Arnold Rosenthal
Attorney, Agent, or Firm—David A. Draegert; Larry R. Cassett

[57] ABSTRACT

A gate valve, for use with evacuable equipment, includes a housing having a pair of aligned ports in opposed walls. A valve seat surrounds one of the ports. A gate member is reciprocally translatable by means of a linear actuator in a direction generally normal to the central axis of the valve seat. Magnetic structures are operably associated with the gate and valve seat for pulling the gate and seat into sealing engagement for closure of the gate valve by exerting a closure force generally parallel to the axis of the valve seat. The linear actuator includes a hollow cylinder having a piston movable therein and axially thereof which is magnetically coupled through the walls of the cylinder to an actuator member mechanically coupled to the gate for effecting reciprocal motion thereof.

19 Claims, 4 Drawing Sheets

GATE VALVE WITH MAGNETIC CLOSURE FOR USE WITH VACUUM EQUIPMENT

BACKGROUND OF THE INVENTION

The present invention relates in general to gate valves for use with vacuum equipment and, more particularly, to an improved gate valve having greatly increased operating life and operating with less shock and vibration so as to reduce particulate contamination of the vacuum system, a particularly desirable result when processing semiconductive wafers.

DESCRIPTION OF THE PRIOR ART

Heretofore, gate valves have been provided for use in conjunction with vacuum equipment, such as sputter coating machines in which a gate assembly is opened and closed by a pneumatic actuator cylinder operable at atmospheric pressure and sealed in a gas-tight manner to the evacuated system by means of a bellows. The gate assembly is enclosed in a valve housing, and aligned ports are provided in opposite walls of the housing. The gate assembly is moved by the pneumatic actuator cylinder between open and closed positions with respect to the ports. The gate assembly included a gate which was mounted on a carriage, and the carriage was moved by the pneumatic actuator cylinder between a first position in which the gate is open and a second position in which the gate is closed. The carriage included a plurality of wheels riding on a ramp such that when the carriage was driven up the ramp, the gate was forced into the closed position. Such a prior art gate valve is disclosed in U.S. Pat. No. 4,238,111 issued Dec. 9, 1980.

One application for the prior art gate valve is to selectively isolate a loadlock chamber from a main evacuated wafer processing chamber in a wafer sputtering machine. The semiconductive wafers are sputter coated by introducing the wafers serially into the relatively small loadlock chamber sealed from the main processing chamber by means of the gate valve. After the loadlock chamber has been evacuated, the gate valve is opened and the wafer to be coated is advanced through the throat of the gate valve into the evacuated main processing chamber wherein it is sputter coated. The coated wafer is transferred back through the throat of the open gate valve to the loadlock. Then, the gate valve is closed and the loadlock let up to atmospheric pressure while the main chamber remains at subatmospheric pressure and the coated wafer removed to its cassette. Such a prior art sputtering machine is disclosed in U.S. Pat. No. 4,523,985 issued June 18, 1985, the disclosure of which is hereby incorporated by reference in its entirety.

One problem associated with the prior art gate valve, in this application, is that the gate valve must be cycled between an open and close position for processing of each wafer. Thus, in a production processing machine, the gate valve experiences many thousands of cycles. The bellows, which seal the pneumatic actuator cylinder of the gate valve from the vacuum chamber tend to fatigue and crack, thereby rendering the gate valve assembly inoperative. Another problem is that the gate carriage assembly, with its associate wheels riding on the ramp structures, produces a substantial amount of shock and vibration releasing an excessive amount of particulate contamination within the evacuated sputtering equipment.

It would be desirable to provide an improved gate valve having an improved gas-tight sealing arrangement for the pneumatic actuator to eliminate the bellows, which tend to fatigue, such that the operating life of the valve would be extended. It would also be desirable to provide a gate valve which reduced the shock and vibration associated with opening and closing so as to reduce particulate contamination within the vacuum equipment.

SUMMARY OF THE PRESENT INVENTION

The principal object of the present invention is the provision of an improved gate valve for use with vacuum equipment, such improved gate valve having increased operating life and less shock and vibration, thereby reducing particulate contamination within the vacuum equipment.

In one feature of the present invention, a magnetic structure is operatively associated with the gate valve for forcing the gate into gas-tight sealing engagement with the valve seat by exerting a magnetically produced force between the valve seat and the gate structure, whereby the gate valve is closed in a gas-tight manner while reducing shock and vibration and attendant particulate contamination of the vacuum equipment.

In another feature of the present invention, the magnetic structure for closing the gate valve includes a permanent magnet operatively coupled to the gate and movable therewith for interacting with a ferromagnetic structure mechanically coupled to the valve seat to produce the pulling force between the valve seat and the gate for closing of the gate valve.

In another feature of the present invention, a control means is provided for selectively controlling the closure force produced by the magnetic structure, whereby the closure of the gate valve is controlled in use.

In another feature of the present invention, the magnetic structure for closing the gate valve includes a plurality of elongated permanent magnets rotatable about an axis of revolution generally parallel to their longitudinal axes for selectively controlling the closure force produced by the magnets between the gate and the valve seat, whereby the closure of the gate valve is controlled in use.

In another feature of the present invention, a pneumatic actuator for reciprocally moving the gate between its open and closed positions includes a hollow, elongated finger or cylinder disposed within the housing with a ferromagnetic piston movable internally of the finger and partitioned from the interior of the valve housing by the walls of the finger. A slider is axially movable of the finger on the outside of the finger and is magnetically coupled to the ferromagnetic piston internally of the finger, whereby the operating life of the actuator is extended in use.

Other features and advantages of the present invention will become apparent upon a perusal of the following specification taken in connection with the accompanying drawings wherein:

DESCRIPTION OF THE PREFERRED EMBODIMENTS

Figure 1:
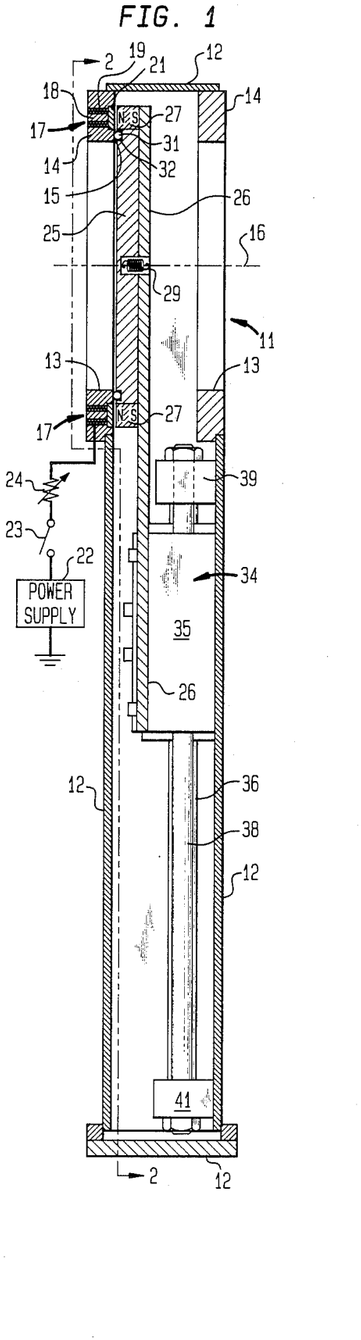
FIG. 1 is a longitudinal, sectional view, partly schematic, of a gate valve incorporating features of the present invention.
Figure 2:
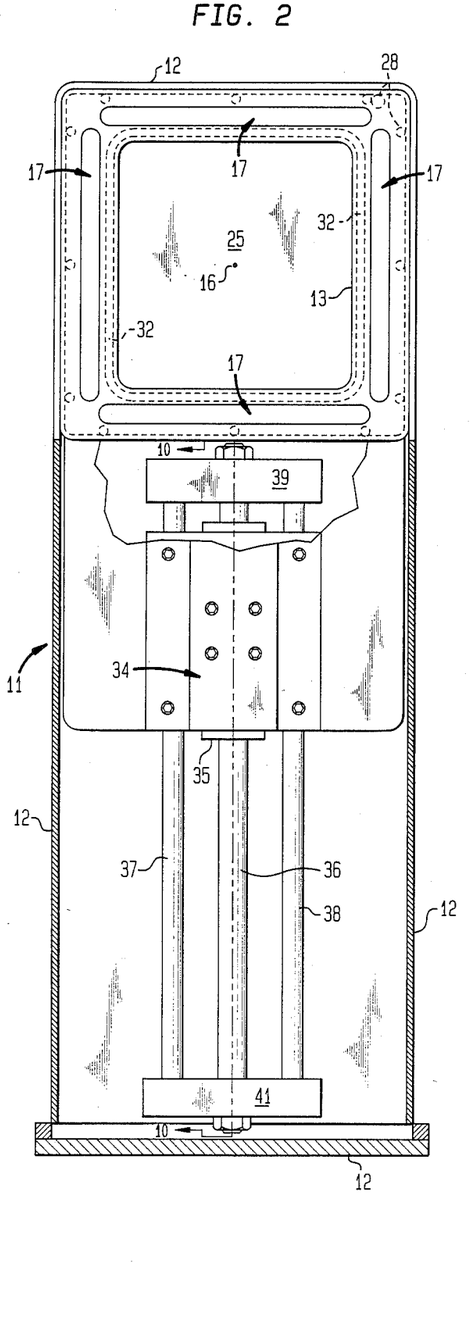
FIG. 2 is a plan view of the structure of FIG. 1 taken along line 2—2 in the direction of the arrows.

Referring now to FIGS. 1 and 2, there is shown a gate valve 11 incorporating features of the present invention. The gate valve includes an evacuable hollow, rectangular housing 12, as of stainless steel, having a pair of aligned ports 13 in opposed broad sidewalls of the housing 12. The ports 13 are defined by the interior of hollow, rectangular flange members 14, as of non-magnetic stainless steel. The inside surface 15 of one of the flange members 14 serves as a valve seat surrounding the port 13. Valve seat 15 has a central axis 16 which is normal to the plane of the valve seat 15 and which is central to the throat or port 13 of the valve housing. A plurality of elongated electromagnets 17 are embedded in the flange 14.

The electromagnets 17 each include an elongated magnetically permeably core member 18, as of soft iron onto which is wound an energizing electrical coil 19. The inside end of the electromagnet 17 is closed off by means of an elongated pole member 21, as of ferromagnetic stainless steel. The various electromagnets 17 are connected in series with an electrical current derived from a power supply 22. The current from the power supply 22 is controlled by a switch 23 and a reostat 24. The electromagnets 17, when energized with electrical current, produce a magnetization transverse to the longitudinal axes of the electromagnets 17 with the direction of polarization being generally parallel to the axis 16 of the valve seat.

A rectangular plate-shaped gate member 25 is disposed, in the closed position, overlaying the valve seat 15 and is fixedly secured to a carrier plate 26 for movement therewith. The gate 25 is made of a ferromagnetic stainless steel and includes a plurality of elongated permanent magnets 27 disposed about the periphery of the gate 25 and in registration with the electromagnets 17. The permanent magnets 27 are magnetically polarized transverse to their longitudinal axes in a direction generally parallel to the axis 16 of the valve seat 15. In a typical example, the permanent magnets 27 are made of a cobalt rare earth material. The gate plate 25 is slidably carried from the carrier plate 26 via the intermediary of a plurality of pins 28 passing through aligned holes in the magnets 27 and such pins 28 extending generally parallel to the axis 16 of the valve seat 15. A centrally disposed tension spring 29 spring biases the gate 25 to the carrier 26.

The surface of the gate 25 which faces the valve seat 15 includes a groove 31 encircling the port 13 and containing a resilient O-ring 32. The O-ring 32 makes a gas-tight seal between the gate 25 and the valve seat 15 when the O-ring 32 is pulled into compressive sealing engagement by means of the electromagnets 17 magnetically interacting with the permanent magnets 27 carried from the gate 25.

The carrier plate 26 is fixedly secured to a pneumatic actuator 34 including a slider 35 which slides on the outside of a pneumatic actuator cylinder or finger 36 and a pair of parallel laterally spaced guide rods 37 and 38. Actuator cylinder 36 and guide rods 37 and 38 are fixed at their ends in brackets 39 and 41 affixed to the inside wall of the housing 12 as by screws, not shown. The pneumatic cylinder 36 and slider assembly 35, forming the actuator, is commercially available from Festo Pneumatic Co., of Hauppauge, N.Y., as a rodless linear drive cylinder, Model DGO 16 having a 7" stroke. This type of pneumatic cylinder is more fully disclosed below with regard to FIG. 10.

Briefly, the hollow, cylinder 36 includes a magnetic piston pneumatically moved axially of the cylinder 36 and magnetically coupled through the wall of the cylinder to permanent magnets carried in the slider 35 so that pneumatically produced movement of the piston within the cylinder 36 produces a corresponding movement of the slider 35 on the exterior of the finger 36. The pneumatic pressure is brought to the interior of the hollow cylinder 36 at opposite ends thereof through ports in the respective brackets 39 and 41. The ports are connected to a supply of gas under pressure by means of tubing, not shown, disposed within the housing 12 and coupled through holes in the housing, not shown by conventional gas-tight feedthrough assemblies.

In operation, the pneumatic actuator 34 is energized by applying gas under pressure to the cylinder 36 containing the piston which causes the piston to move toward the axis 16 of the valve seat 15. This causes the slider 35 and attached carrier plate 26 to be advanced in a direction normal to the axis 16 to the valve seat 15 and to the closed position as shown in FIGS. 1 and 2. When the gate plate 25 is positioned overlaying the port 13 and valve seat 15, the electromagnets 17 are energized with current from the power supply 22 via switch 23 and reostat 24 to produce a magnetic field of opposite polarity to the polarity of the permanent magnets 27 for causing the gate 25 to be pulled in a direction parallel to the axis 16 of the valve seat and into gas-tight sealing engagement with the valve seat 15. More particularly, the gate 25 is pulled toward the electromagnets 17 so as to cause compression of the O-ring 32 between the valve seat 15 and the gate 25 producing a gas-tight seal therebetween.

The gate valve 11 is thus closed and its rate of closure can be controlled by means of variation of the reostat 24 so as to produce the desired rate of closure of the valve 11. In a typical example, the valve 11 has a throat diameter of 3" to 10" and when closed, can support an atmosphere of pressure differential across the valve without leakage so that a loadlock or other apparatus on one side of the valve 11 can be operated at atmospheric pressure, whereas the other side of the valve can be operated at a relatively low pressure as of between $10^{-3}$ and $10^{-8}$ torr.

To open the gate valve 11, the electromagnets 17 are deenergized or energized with current in the opposite sense so as to remove the magnetic pulling force between the gate 25 and the valve seat 15 or actually produce a repulsive force which acts together with the tension of spring 29 to pull the gate 25 away from the valve seat 15 to open the valve 11. After the gate valve 11 has been opened, the actuator 34 is energized with pneumatic pressure supplied to the cylinder 36 to cause the piston and slider to move in a direction away from and normal to the axis 16 of the valve seat 15 to a position which is substantially at the opposite end of the actuating cylinder 36, i.e., adjacent the lower bracket 41. This retracts the gate 25 into a substantially unobstructed position relative to the gas flow passageway between the ports 13 of the gate valve 11.

Figure 3:
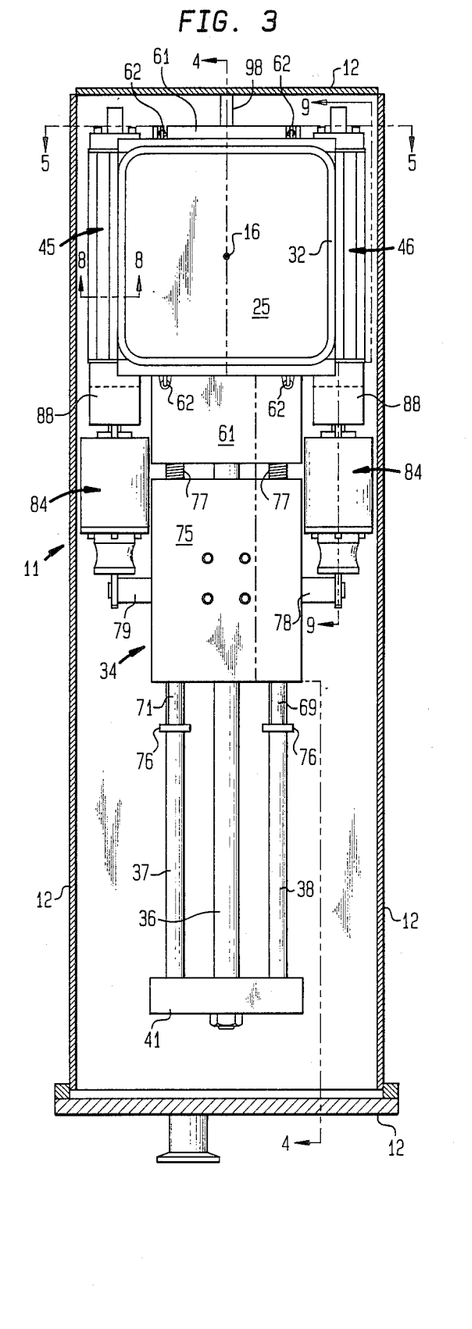
FIG. 3 is a view similar to that of FIG. 2 depicting an alternative embodiment of the present invention.
Figure 4:
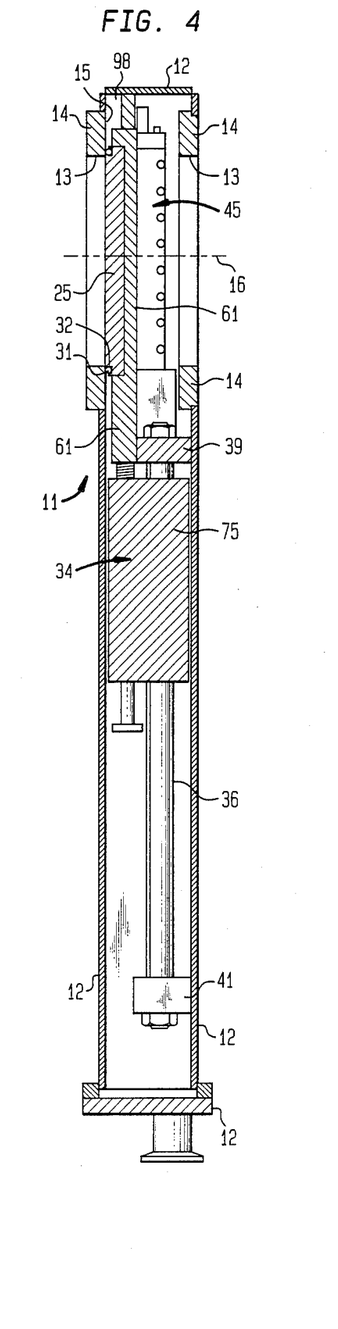
FIG. 4 is a sectional view of the structure of FIG. 3 taken along line 4—4 in the direction of the arrows.
Figure 5:
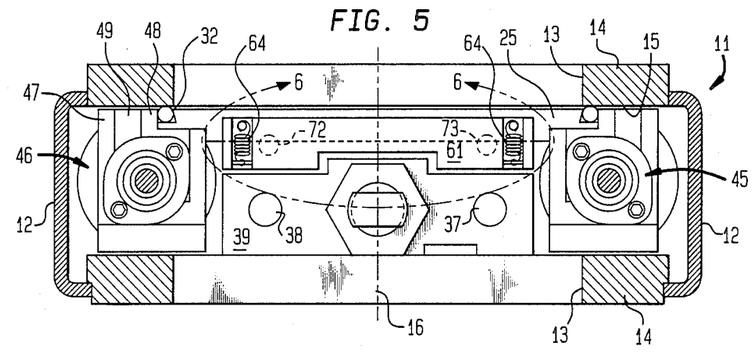
FIG. 5 is a transverse, sectional view of a portion of the structure of FIG. 3 taken along line 5—5 in the direction of the arrows.

Referring now to FIGS. 3, 4 and 5, there is shown an alternative embodiment of the gate valve 11 incorporating features of the present invention. The same reference numerals have been utilized in these figures to describe the same elements previously described with regard to FIG. 1 and 2. The gate valve 11 of FIGS. 3-5 is essentially the same as that of FIGS. 1 and 2 with the exception that the electromagnets 17 have been replaced by permanent magnet assemblies 45 and 46 fixedly attached to and movable with the gate plate 25 for producing the magnetic force for closing the gate valve 11. More particularly, the two elongated, permanent magnet assemblies 45 and 46 are disposed on opposite sides of the axis 16 of the valve seat 15 with the magnets 45 and 46 being fixedly secured to the gate plate 25 via screws, not shown.

Figures 6, 8:
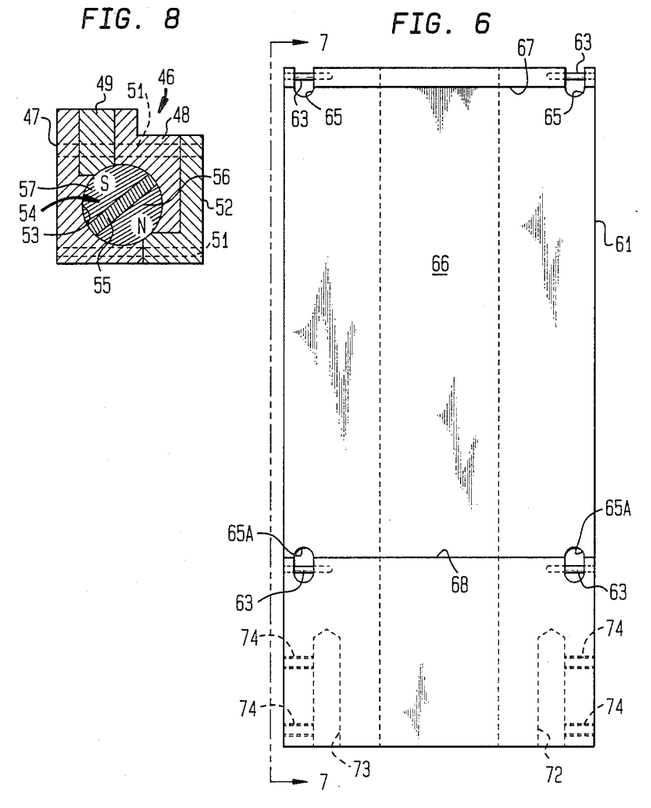
FIG. 6 is a plan view of a portion of the structure of FIG. 5 delineated by line 6—6.
FIG. 8 is a transverse, sectional view of a portion of the structure of FIG. 3 taken along line 8—8 in the direction of the arrows.

The permanent magnet assemblies 45 and 46 are shown in greater detail in FIG. 8 and each comprises a pair of elongated pole members 47 and 48 made of a suitable ferromagnetic material, such as cold, rolled steel. The pole members 48 and 47 are spaced apart by means of an elongated rectangular spacer member 49 as of aluminum and are clamped together by means of a plurality of bolts passing through bores 51 passing through an elongated cap member of j-shaped cross-section 52, the respective pole members 47 and 48 and the spacer member 49.

A longitudinally directed bore 53 passes axially through the assembly and a permanent magnet assembly 54 is coaxially mounted of the bore 53 for rotation therein. The permanent magnet assembly 54 includes an elongated rectangular, relatively thin permanent magnet member 55 as of neodymium-iron boron, commercially available from Magnet Sales of Culver City, Calif. and being permanently magnetized in a direction transverse to the two major faces of the rectangular permanent magnet member 55. Permanent magnet member 55 is bonded inbetween a pair of essentially semicylindrical pole piece members 56 and 57 as of cold, rolled steel by means of a suitable epoxy adhesive. When the permanent magnet assembly 54 is rotated so that the direction of magnetization is aligned with a radial line passing through the central axis of the magnet 55 and the nonmagnetic members 49 and 52, then, the magnetomotive force of the permanent magnet 55 is essentially shunted by the respective pole members 47 and 48 such that no magnetic pulling force is obtained between the pole members 47 and 48 and the flange 14 which is made of a ferromagnetic material, such as 410 magnetic stainless steel. However, when the permanent magnet assembly 54 is rotated such that the polarization of the permanent magnet 55 is normal to the radial line interconnecting two non-magnetic members 49 and 52, the pole pieces 47 and 48 have opposite polarities producing a substantial magnetic field across the spacer 49, thereby inducing a substantial magnetic polarization of the ferromagnetic flange 14. This induced polarization of the flange 14 produces a substantial pulling force, as of 600 pounds, between the permanent magnets 45 and 46 and the flange 14 for pulling the permanent magnets and attached gate plate 25 into sealing engagement by compression of the O-ring 32 against the valve seat 15.

Figure 7:
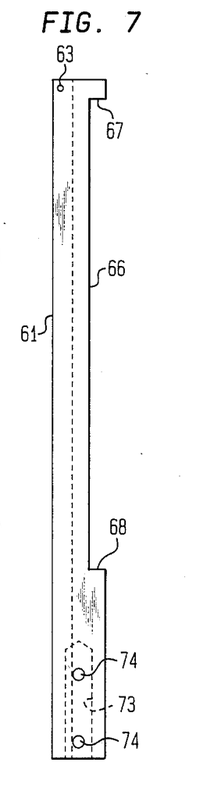
FIG. 7 is a side elevational view of the structure of FIG. 6 taken along line 7—7 in the direction of the arrows.

The gate plate 25 is captured to an underlying carrier plate 61 by means of a plurality of outwardly extending tabs 62 coupled to pins 63 in the carrier plate 61 via tension springs 64. The tension springs 64 are carried within slots 65 and bores 66 passing through the carrier plate 61. The carrier plate 61, see FIGS. 6 and 7, includes a lateral recess at 66 within which to slidably receive the gate plate 25. Shoulders 67 and 68 at opposite ends of the recess 66 serve to retain the gate plate 25 therein against longitudinal movement, whereas the tabs 62 are movable within the slots 65 and bores 65A and serve to laterally restrain movement of the gate plate 25 relative to the carrier plate 61.

A pair of longitudinally directed guide rods 69 and 71 are captured within longitudinal bores 72 and 73 in the carrier plate 61. The rods 69 and 71 are captured in the bores 72 and 73 by means of set screws passing through lateral threaded bores 74 in the carrier plate 61 which intersect with the longitudinal bores 72 and 73.

The rods 69 and 71 pass through longitudinal bores in a slider block 75 of the pneumatic actuator 34. The ends of the rods 69 and 71 are flanged at 76 to provide stops. Compression springs 77 are coaxially mounted surrounding the rods 69 and 71 between the carrier plate 61 and the slider block 75.

Figure 9:
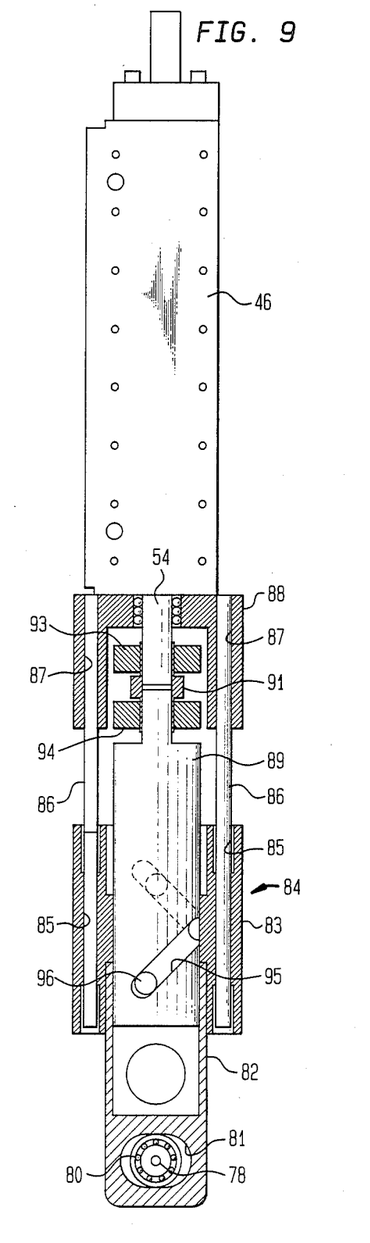
FIG. 9 is an enlarged, sectional view of a portion of the structure of FIG. 3 taken along line 9—9 in the direction of the arrows.

Yoke members 78 and 79 are fixedly secured to the slider block 75 and extend laterally therefrom. Ball-bearing assemblies 80, see FIG. 9, are carried upon the end of the yoke members 78 and 79 for engagement with elongated openings 81 in the end of longitudinally directed actuating shafts 82 which are fixedly secured to sleeves 83 of linear-to-rotation motion converters 84 of conventional design. Such converters are commercially available as Rollnut® oscillators, Model 25B10-4, available from Flennor Inc., of Georgetown, Conn. The sleeve 83, which is fixedly secured to the actuator shaft 82, includes a plurality of longitudinal bores at 85 to slidably receive longitudinally directed pins 86 anchored in longitudinal bores 87 in brackets 88 fixedly secured to the ends of the permanent magnet assemblies 45 and 46.

The longitudinally directed permanent magnet 54 of the permanent magnet assembly 46 is coupled to a rotatable drive shaft 89 of the Rollnut oscillator 84 by means of a collet 91 clamped to the respective shafts 89 and 54 via clamps 93 and 94. A helical slot 95 is provided in the central drive shaft 89 of the Rollnut 84 and a radially directed pin 96 affixed to the sleeve 83 for movement therewith rides within the helical slot 95. As the sleeve 83 moves axially on the pins 86, the radially directed pin, 96 riding in the helical slot 95 imparts rotation to the central shaft 89 of the Rollnut 84, such rotation being coupled to the central shaft 54 of the permanent magnet assemblies 45 and 46. A particular Rollnut assembly 84 is arranged so that one inch of linear travel of the yoke 78 imparts 90° of rotation to the permanent magnet shaft 54 of the permanent magnet assembly 46, thereby causing the permanent magnet assemblies 45 and 46 to go from a state of no magnetic attraction to the valve seat 14 to a condition of maximum attraction to the valve seat 14. The elongation of the hole 81 in the driveshaft 82 accommodates the lateral motion of the gate plate 25 and permanent magnet assemblies 45 and 46 to effect closure of the gate valve 11.

In operation, to close the gate valve 11, the pneumatic actuator 34 is actuated in a manner as previously described with regard to the embodiment of FIGS. 1 and 2 to cause the slide block 75 to slide longitudinally of the central cylinder 36 and guide rods 37 and 38 toward the closed position as shown in FIGS. 3 and 4. A stop 98 is disposed at the end of the housing 12 projecting inwardly thereof. When the carrier plate 61 engages the stop 98, the compression springs 77 are compressed and the yokes 78 and 79 continue to advance while actuating the Rollnut assemblies 84 to produce rotation of the permanent magnets 54 within the permanent magnet assemblies 45 and 46, thereby producing an increasing magnetic closure force between the gate plate 25 and the valve seat 14. This magnetic force ultimately produces compression and thus gas-tight sealing of the compression ring 32 against the valve seat 15.

When it is desired to open the gate valve 11, the pneumatic forces are reversed in the pneumatic actuator 34 to cause the slide block 75 to be retracted on the guide rods 37, 38 and central cylinder 36. When the slide block 75 has been retracted sufficiently to engage the stops 76 on the rods 69 and 71, further retractive movement of the slide block 75 is coupled to the carrier plate 61 for retracting the carrier plate 61 and attached gate plate 25. When the slide block 75 has been fully retracted, on the pneumatic cylinder 36 and guide rods 37 and 38, the gate plate 25 is moved to its fully retracted or fully open position as previously described with regard to FIGS. 1 and 2.

Also, as the slide block 75 of the pneumatic actuator 34 is being retracted from the fully closed position, and while the springs 77 are still in compression, the yokes 78 and 79 pull the actuator shafts 82 of the Rollnut assemblies away from the bracket members 88, thereby causing the permanent magnets 54 of the permanent magnet assemblies 45 and 46 to be rotated to progressively shunt out the magnetic force of the permanent magnet assemblies 45 and 46. When the magnetomotive forces of the magnet 45 and 46 have been shunted, the tension springs 64, holding the gate plate 25 to the carrier plate 61, retract the gate plate 25 out of sealing engagement with the valve seat 15. When the slide block 75 picks up the stops 76, it causes the carrier plate 61 to be retracted on the main cylinder 36 and guide rods 37 and 38 to the fully retracted position.

Figure 10:
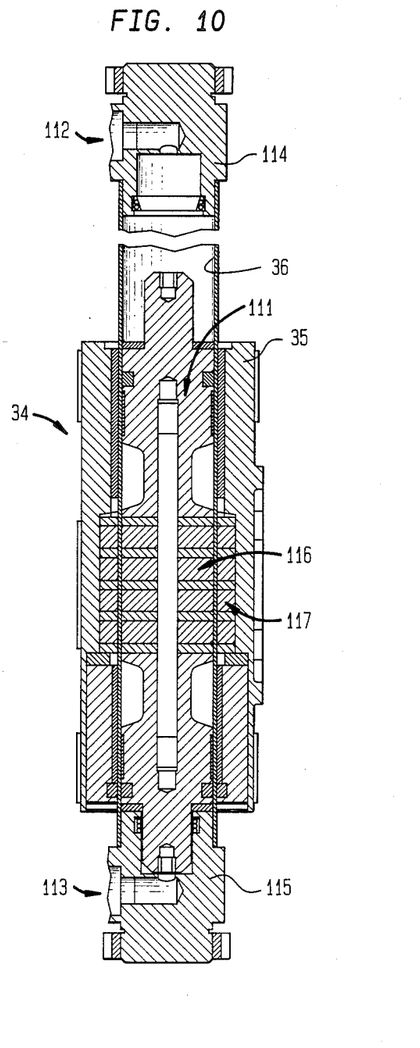
FIG. 10 is an enlarged, sectional view of a portion of the structure of FIG. 2 taken along line 10—10 in the direction of the arrows.

Referring now to FIG. 10, the pneumatic actuator 34 is shown in greater detail. The hollow, cylindrical tube or finger 36 forms a portion of the wall of the housing 12 and contains therein a piston 111 for slidable rectilinear translation axially of the cylindrical finger 36 in response to gas pressure applied to the interior of the finger 36 via gas ports 112 and 113 formed in end closure members 114 and 115 closing off the ends of the hollow, cylindrical finger 36. Tubes, not shown, provide a source of gas pressure connected into the ports 112 and 113. The pneumatic pressure may be applied to either one of the gas ports 112 or 113 relative to the other for urging the piston 111 in one direction or the other within the hollow cylindrical finger 36.

The piston 111 includes an axial array of annular, permanent magnet members 116 for producing intense magnetic fields which loop through the thin wall of the cylindrical finger 36 for magnetic attractive operation with a similar array of annular magnets 117, carried at the inner periphery of the slider 35. Thus, the force exerted on the piston 111 by the pneumatic pressure connected to gas ports 112 and 113 serves to force the piston 111 to and fro within the hollow, cylindrical finger 36, whereas the slider 35 is caused to follow and to be magnetically coupled for movement with the piston 111 by means of the cooperative magnet arrays 116 and 117. This type of actuator is called a rodless, linear drive cylinder and is commercially available from Festo Pneumatics, Co.

In the gate valve embodiment of FIGS. 1 and 2, the electromagnets 17 have been described as being disposed in the flange 14 of the valve seat 15, whereas the permanent magnets 27 were carried from the gate 25. This is not a requirement, the relative positions of the electromagnets 17 and permanent magnets 27 may be reversed so that the electromagnets are carried from the gate 25 and the permanent magnets 27 or ferromagnetic material is embedded in the flange 14 of the valve seat 15. Also, with the gate valve embodiment of FIGS. 3-5, the permanent magnet assemblies 45 and 46 may be incorporated into the flange 14 and the ferromagnetic member for cooperation with the permanent magnets 45 and 46 may be carried from the gate plate 25.

The advantages of the gate valve of the present invention include its ability to operate for many more cycles without failure than the previous valves due to the provision of the rodless linear drive cylinder and pneumatic actuators 34. Also, particulate contamination is greatly reduced due to the reduction of shock and vibration occasioned by closure of the valve due to use of the magnetic closure mechanism.

What is claimed is:

1. In a gate-valve apparatus of the type wherein a valve seat structure surrounds a throat portion of a fluid passageway and the flow of fluid through the throat portion is controlled by means of a gate structure translatable in a direction generally normal to the axis of the valve seat, the improvement comprising:

magnetic means mechanically, operatively associated with said valve-seat structure and said gate structure for selectively opening or forcing said valve-seat structure and gate structure into gas-tight sealing engagement by exerting a variable magnetically produced force between the valve seat and the gate structure with a predominant component of the force being produced in a direction parallel to the axis of the valve seat, whereby the gate valve is closed in a gas-tight manner.

2. The apparatus of claim 1 wherein said magnetic means includes a permanent magnet mechanically coupled to the gate structure and moveable therewith;

a ferromagnetic structure mechanically coupled to the valve-seat structure; and a magnetic field produced by said permanent magnet interacting with said ferromagnetic structure to produce the pulling force between the valve-seat structure and the gate structure for closing the gate valve.

3. The apparatus of claim 1 including:

control means for selectively controlling the pulling force produced by said magnetic means between the gate structure and the valve-seat structure, whereby the closure of the gate valve is controlled in use.

4. The apparatus of claim 1 wherein said magnetic means includes a plurality of elongated, permanent magnets with the direction of magnetization of said permanent magnets being transverse to their longitudinal axes.

5. The apparatus of claim 4 wherein said permanent magnets are disposed in a plane substantially normal to the axis of the valve seat.

6. The apparatus of claim 5 wherein at least a pair of said permanent magnets are disposed on opposite sides of the axis of the valve seat.

7. The apparatus of claim 4 including means for rotating said elongated, permanent magnets about an axis of revolution generally parallel to their longitudinal axes for selectively controlling the pulling force produced by said magnets between the gate structure and the valve-seat structure, whereby the closure of the gate-valve is controlled in use.

8. The apparatus of claim 2 wherein said ferromagnetic structure includes an electromagnet, and means for energizing said electromagnet with electric current, to produce the pulling force between the valve-seat structure and the gate structure for closing the gate valve.

9. A gate-valve apparatus for use in conjunction with vacuum equipment and the like, comprising:
a housing having a pair of opposite walls with ports therein defining a gas passageway through said housing;
a valve-seat disposed to surround one of said ports and having a central axis;
a gate assembly mounted in said housing for selectively mating with said valve seat in gas-tight sealing engagement for selectively sealing said port in a gas-tight manner for closing the gate valve;
said gate assembly including a carrier;
a gate mounted on said carrier;
an actuator coupled to said carrier for reciprocally moving said gate in a direction generally normal to the axis of said valve seat between a first position overlaying said valve seat and a second position displaced from said valve seat; and
magnetic structure selectively, mechanically, operatively associated with said valve seat and said gate for selectively opening or forcing said valve seat and gate into a gas-tight sealing engagement by exerting a variable, magnetically produced force between the valve seat and the gate, with a predominant component of the force parallel to the axis of the valve seat, whereby the gate valve is selectively closed in a gas-tight manner.

10. The apparatus of claim 9 wherein said magnetic structure includes a plurality of elongated, permanent magnets with the direction of magnetization of said permanent magnets being transverse to their longitudinal axes.

11. The apparatus of claim 10 wherein at least a pair of said permanent magnets are disposed on opposite side of the axis of said valve seat with their longitudinal axes being disposed in a plane generally perpendicular to the axis of said valve seat.

12. The apparatus of claim 11 including means for rotating said permanent magnets about their longitudinal axes for selectively controlling the valve closing force exerted between said valve seat and said gate.

13. The apparatus of claim 12 wherein said pair of permanent magnets are carried from and movable with said carrier.

14. The apparatus of claim 11 wherein said permanent magnets are a part of said gate assembly and wherein said valve seat includes a portion made of a ferromagnetic material for magnetic interaction with said permanent magnets for producing the force for closing the gate valve.

15. The apparatus of claim 11 wherein said permanent magnets are a part of said gate assembly and including an electromagnet rigidly affixed to said valve seat for magnetic interaction with said permanent magnets for producing the force for closing the gate valve.

16. The gate-valve apparatus of claim 9 wherein said actuator includes a hollow, elongated finger disposed within said housing;
ferromagnetic means axially movable internally of said hollow finger and being partitioned from the interior of said housing by the walls of said hollow finger;
slider means axially movable of said elongated finger on the outside of said finger and being magnetically coupled to said ferromagnetic means internally of said finger for movement therewith;
said carrier being coupled to and movable with said slider means for reciprocally moving said gate in a direction generally normal to the axis of said valve seat between said first position and said second position; and
forcing means operable within said finger for moving said ferromagnetic means within said finger to produce a corresponding axial movement of said slider means and said gate, whereby the operating life of said actuator is extended in use.

17. A gate-valve apparatus for use in conjunction with vacuum equipment and the like, comprising:
a housing having a pair of opposite walls with ports therein defining a gas passageway through said housing;
a valve seat disposed to surround one of said ports and having a central axis;
a gate assembly mounted in said housing for selectively mating with said valve seat in gas-tight sealing engagement for selectively sealing said port in a gas-tight manner for closing the gate valve;
said gate assembly including a carrier;
a gate mounted on said carrier;
an actuator coupled to said carrier for reciprocally moving said gate in a direction generally normal to the axis of said valve seat between a first position overlaying said valve seat and a second position displaced from said valve seat;
said actuator including a hollow, elongated finger disposed within said housing;
ferromagnetic means axially movable internally of said hollow finger and being partitioned from the interior of said housing by the walls of said hollow finger;
slider means axially movable of said elongated finger on the outside of said finger and being magnetically coupled to said ferromagnetic means internally of said finger for movement therewith;
said carrier being coupled to and movable with said slider means for reciprocally moving said gate in a direction generally normal to the axis of said valve seat between said first position and said second position; and forcing means operable within said finger for moving said ferromagnetic means within said finger to produce a corresponding axial movement of said slider means and said gate, whereby the operating life of said actuator is extended in use.

18. The apparatus of claim 1, wherein said magnetic means includes a plurality of elongated magnetic structures with the direction of magnetization of said structures being transverse to their longitudinal axes.

19. The apparatus of claim 9, wherein said magnetic structure includes a plurality of elongated magnetic structures with the direction of magnetization of said structures being transverse to their longitudinal axes.

* * * * *